United States Patent [19]
Goodwin et al.

[11] Patent Number: 5,114,226
[45] Date of Patent: May 19, 1992

[54] 3-DIMENSIONAL VISION SYSTEM UTILIZING COHERENT OPTICAL DETECTION

[75] Inventors: Frank E. Goodwin; Dana Simonson, both of Burke, Va.

[73] Assignee: Digital Optronics Corporation, Springfield, Va.

[21] Appl. No.: 589,625

[22] Filed: Sep. 28, 1990

Related U.S. Application Data

[63] Continuation of Ser. No. 28,317, Mar. 20, 1987, abandoned.

[51] Int. Cl.$^5$ .......................... G01C 3/08; G01C 1/00; G01B 11/26
[52] U.S. Cl. ...................... 356/5; 250/206.2; 356/4.5; 356/152; 356/351
[58] Field of Search ................. 356/4.5, 5, 28.5, 141, 356/152, 351; 250/203.2, 206.2

[56] References Cited

U.S. PATENT DOCUMENTS

| | | | |
|---|---|---|---|
| 3,620,593 | 11/1971 | Tackaberry | 356/351 |
| 4,167,329 | 9/1979 | Jelalian et al. | 356/5 |
| 4,477,184 | 10/1984 | Endo | 356/5 |
| 4,518,256 | 5/1985 | Schwartz | 356/5 |
| 4,594,000 | 6/1986 | Falk et al. | 356/5 |
| 4,611,912 | 9/1986 | Falk et al. | 356/5 |
| 4,721,385 | 1/1988 | Jelalian et al. | 356/5 |
| 4,738,531 | 4/1988 | Lloyd et al. | 356/152 |

OTHER PUBLICATIONS

IBM, Tech. Dis. Bul., vol. 14, No. 7, Dec. 1971, Harrison, p. 1949.
Doherty, SPIE, vol. 192, Interferometry, 1979, p. 140.

*Primary Examiner*—Stephen C. Buczinski
*Attorney, Agent, or Firm*—Longacre & White

[57] ABSTRACT

A three-dimensional optical scanning vision system capable of producing high-resolution images in real-time includes an optical source for producing a source light beam. The source light beam is directed to a beam splitter which splits it into a local oscillator beam and a signal beam. The local oscillator beam is directed toward a photodetector, while the signal light beam is directed toward a target. Light reflected from the target is received by the beam splitter and directed toward a retroreflector which returns the beam to the beam splitter interface. Quarter wave plates and the retroreflector insure that the return light beam and the local oscillator beam are collimated and have the same polarization state. Mixing of the local oscillator beam and the return light beam occurs at the beam splitter interface, thus providing coherent optical detection by the photodetector. The photodetector thus provides an output signal providing a high degree of information about the target. The system also includes scanner optics to scan the signal light beam across the target. A processor is also included for outputting a three-dimensional image of the target, and for controlling the scanner optics.

22 Claims, 6 Drawing Sheets

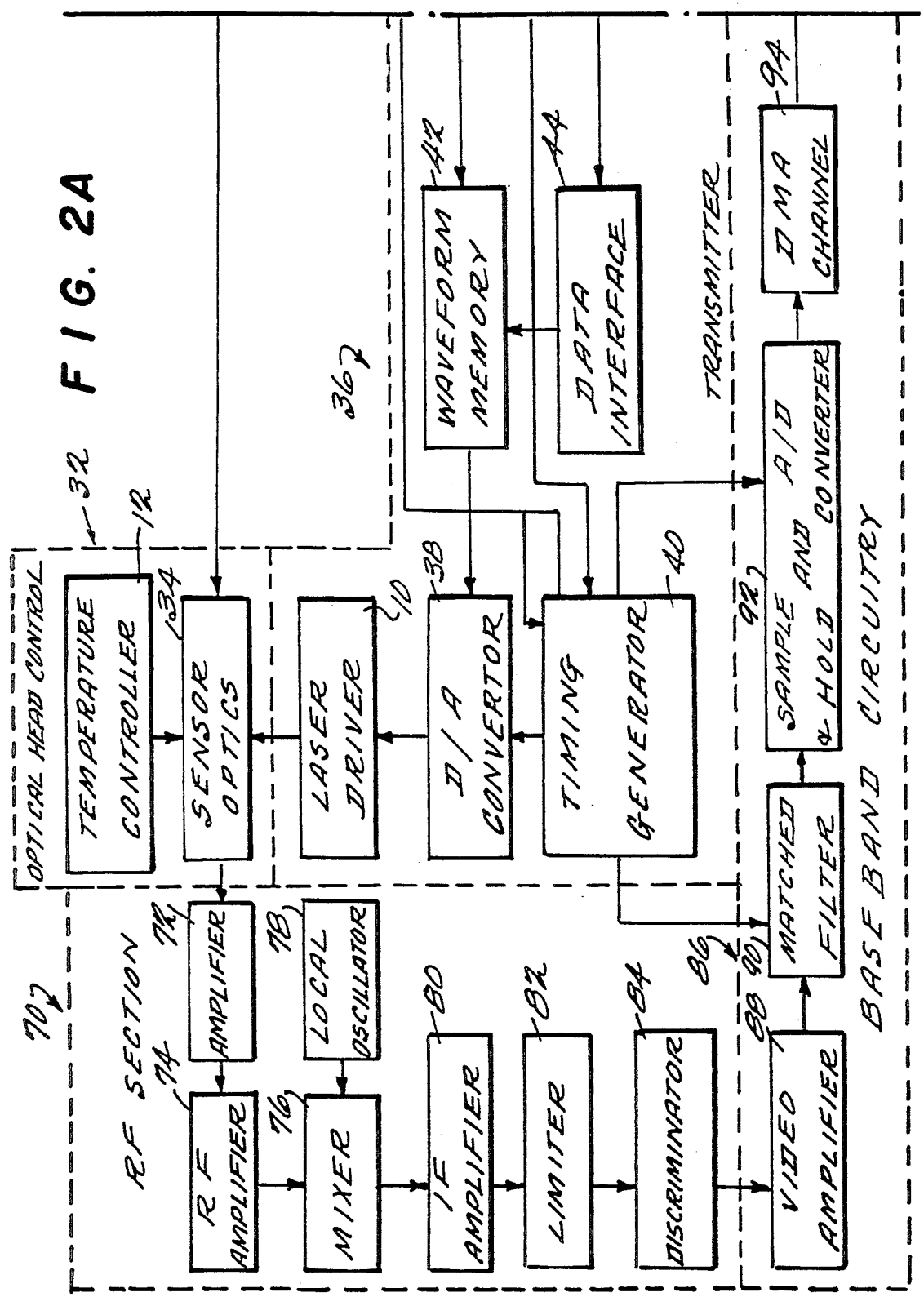

3-DIMENSIONAL VISION SYSTEM UTILIZING COHERENT OPTICAL DETECTION

This is a continuation of application Ser. No. 07/028,317, filed Mar. 20, 1987, which was abandoned upon the filing hereof.

BACKGROUND OF THE INVENTION

The present invention relates to a three-dimensional vision system utilizing coherent optical detection. More particularly, the present invention relates to a real-time, high-resolution, optical scanning vision system capable of providing a 256×256×256 volume of information about a target at rates approaching 10 frames per second.

Many known vision systems are capable of providing information about a target. For example, television cameras can provide moderate-resolution, two-dimensional images of a target in real time. Likewise, White (structured light) scanners are capable of providing high-resolution images, but not in real time. Basically, all known vision systems must strike a balance between resolution and scan time. Systems providing high-resolution images are not capable of providing real-time scanning, and conversely, real-time systems only provide moderate-to-low resolution images (usually two-dimensional). Thus, applications which require high-resolution, three-dimensional, real-time imaging systems are presently unfulfilled.

Recently, advances in optical technology have enabled the use of coherent (heterodyne) optical detection techniques. Such coherent techniques have provided a 1,000-fold increase in the amount of information able to be detected for each pixel or voxel of the target. The techniques and advantages of optical detection are generally described in the co-pending U.S. application Ser. No. 590,350 entitled "FREQUENCY MODULATED LASER RADAR", the teachings of which are incorporated herein by reference. Additionally, the article entitled "COHERENT OPTICAL DETECTION; A THOUSAND CALLS ON ONE CIRCUIT", by Link and Henry, IEEE SPECTRUM, February 1987, pp. 52-57 describes the present state of optical heterodyne reception. The teachings of this article are also incorporated into this application by reference.

The advantages of coherent optical detection are fundamental. The information carrying capacity of the optical beam reflected from the target is orders of magnitude greater than other available systems. Briefly, the use of optical heterodyne detection allows for optical radiation detection at the quantum noise level. As such, coherent optical systems provide greater range, accuracy, and reliability than many known prior art telemetry and vision systems. For example, coherent optical systems are capable of providing 1,000-times faster scanning for a given precision. This means that the optical beam is not required to dwell upon a specific location on the target for very long in order to obtain sufficient information about the characteristics of that target location. Likewise, coherent optical systems can provide 1,000-times more precision for a given scanning speed. Also, each measurement yields a unique, unambiguous reading. Also, rough surfaces may be easily scanned using radar processing techniques. Coherent optical system also can provide a greater scanning range, a greater working depth of field, and may also operate in ambient light conditions.

Briefly, optical heterodyne detection provides a source light beam which is directed to a target and reflected therefrom. The reflected light beam is then mixed with a local oscillator light beam on a photodetector to provide optical interference patterns which may be processed to provide detailed information about the target. Optical heterodyne techniques takes advantage of the source and reflected light beam reciprocity. For example, these light beams are substantially the same wavelength and are directed over the same optical axis. This provides an improved signal-to-noise ratio and sensitivity. The signal-to-noise ratio is sufficiently high so that a small receiving aperture may be used, in contrast to known systems. Since a small receiver aperture can still provide detailed information about the target, the scanning optics of a vision system may be made very small and provide related increases in scanning speed. For example, a coherent optical system using a $\frac{1}{2}''$ aperture can scan much faster than a 4" aperture used with a direct optical detection system.

Prior art shows that several laser systems have been applied to metrology, and to some extent to gauging. The best known of these is the interferometer which has become a standard for precision measurements. However, the interferometer only measures changes in distance and must be implemented with precisely oriented cooperative reflectors. The proposed invention achieves precise measurement of absolute distances off ordinary and rough surfaces. Other prior art laser applications to gauging achieved distance measurements with incoherent detection and triangulation of a laser source and detection system. The accuracy and versatility of such systems are extremely limited.

Key technologies of AlGaAs laser diodes and fiber optical components are enjoying a burst of development for applications in telecommunications. Because of these efforts, recent improvements in the quality of injection laser diodes provide the coherence length and wave length tuning range needed for a precision, coherent optical scanning system. The small size of the injection laser diode and high-technology integrated optical assemblies make possible the development of a new family of small, low-cost, precise scanning sensors which are orders of magnitude more accurate and more reliable than their more conventional counterparts.

The fundamental concept of coherent optical detection used in the present invention is based on the FM CW radar principle. The FM optical source produces a continuous beam of radiation which is directed at the target. A local oscillator beam is derived from the source light beam and directed to a photodetector. Light reflected from the target is also directed to the photodetector. Since the detector sees energy reflected from the target as well as directly from the source, interference beats are detected as the frequency is swept over the interval $\Delta f$. The rate of these beats is a function of the range as well as the magnitude of the frequency interval. This technique allows a tremendous amount of information concerning the target to be derived from the reflected light beam.

One coherent optical detection system is described in U.S. Pat. No. 4,611,912 to Falk et al. Falk et al '912 describes a method and apparatus for optically measuring a distance to and the velocity of a target. In Falk et al, a laser diode provides a linearly polarized, amplitude modulated (with frequency modulated sub carrier) source light beam. The source light beam is directed to a polarization dependent beam splitter which reflects it toward the target. Between the beam splitter and a target is disposed a quarter wave retardation plate which converts the linearly polarized source light beam to right-hand circularly polarized optical radiation. Between the quarter wave plate and the target, a local oscillator reflector plate reflects approximately 1% of the source light beam back toward the beam splitter, while allowing approximately 99% of the source light beam to pass toward the target. Light reflected from the target and the local oscillator beam are thereby converted from right-hand circularly polarized optical radiation to left-hand circularly polarized optical radiation. These beams then pass back through the quarter wave plate and are thereby converted to linearly polarized light beams. These linearly polarized light beams pass through the polarizing beam splitter and are concentrated on a PIN diode by a collecting optical lens. Thus, the local oscillator and the return beam are both linearly polarized in the same direction and are directed along the same optical axis. Thus, the PIN diode detects an optically mixed signal containing the local oscillator beam and the light beam reflected from the target.

However, an extreme disadvantage of the Falk et al '912 system is that very close alignment is required between the optical components. Thus, the laser diode, the beam splitter, the quarter wave plate, the local oscillator reflecting plate, and the PIN diode must be carefully adjusted before usable signals may be obtained. In addition, such close adjustment allows for rapid system degradation with temperature changes and mechanical shocks. Additionally, the Falk et al '912 system only provides apparatus for measuring distances and velocity. Such a system would be difficult to adapt to a scanning vision system since scanning components must be added which would further exacerbate the optical alignment sensitivity problems noted above.

U.S. Pat. No. 4,594,000 to Falk et al also discloses a system for optically measuring the distance to and velocity of a target. This system is somewhat like Falk et al '912, but incorporates a reference arm to provide more precise measurements of distance and velocity. Specifically, the FM source light beam is also provided to a reference arm which also includes a polarization-dependent beam splitter, a quarter wave plate, and a local oscillator reflecting mirror. The local oscillator reflecting mirror again reflects a local oscillator beam back through the beam splitter to a PIN diode. The reference source light beam is allowed to propagate through the local oscillator reflecting mirror into a fiber optic coil of known length having a reflecting element at the end thereof. The reference source light beam is reflected back through the fiber optic coil and mixes with the local oscillator beam at the PIN diode. Means are then provided to determine a representative value of the frequency of the output signal from both the target and reference arms. A processor is then utilized to calculate the distance and velocity of the target from the representative frequency values derived from both the source and the reference optical heterodyne systems. While this system is capable of providing great precision in velocity and distance measurements, it also suffers the optical alignment sensitivity problems of Falk et al '912.

Therefore, for a practical, three-dimensional, scanning vision system, there is a requirement for an optical detection system whose optical alignment sensitivity is extremely low.

SUMMARY OF THE INVENTION

The present invention provides a three-dimensional, high-resolution, real-time scanning vision system which overcomes the problems of the prior art. Specifically, the present invention provides a frequency modulated optical source, an optical heterodyne detection scheme not requiring a reference arm, and a local oscillator combining (peel-off) technique which reduces optical alignment sensitivity.

According to the present invention, a three-dimensional, real-time optical scanning system comprises an optical source for providing a source light beam. A beam splitter receives the source light beam and splits it into a signal light beam which is directed toward a target, and a local oscillator beam which is directed toward a photodetector. A quarter wave retardation plate then converts the polarization of the signal light beam. The signal light beam is reflected from a target and reverses polarization and is returned as a return light beam. The return light beam passes back through the quarter wave retardation plate where its polarization is again converted. The return light beam is then reflected in the beam splitter and directed toward a second quarter wave retardation plate which again converts its polarization. This light beam is then directed to a retroreflector which again reverses the polarization of the light beam and directs it back toward the second wave retardation plate. The second wave retardation plate finally converts the light beam into the same polarization as the local oscillator beam and directs the return light beam toward the photodetector along the same optical axis as the local oscillator light beam. This same polarization denotes a polarization which allows the two waves to mix, and accordingly is a same angle of polarization if linear and a same direction of polarization if circular.

The photodetector thus receives an optically mixed signal including the local oscillator light beam and the return light beam, both having the same polarization. An output signal from the photodetector is then provided to a processor which derives information contained in the return light beam.

Scanning means are located down-beam from the first quarter wave retardation plate in order to scan the signal light beam across the target. The scanning means are also controlled by the processor in order to derive an image of the entire target.

Preferably, the optical source means provides a frequency-modulated source light beam. Also, the photodetector is preferably a PIN diode which provides improved detection over known avalanche photodetectors.

The use of the retroreflector guarantees that the return light beam will be co-linear with the local oscillator beam, thus making careful optical alignment unnecessary. The use of the retroreflector also allows the incidence angle of the polarizing prism to be adjusted, thus selecting the splitting ratio between the signal beam and the local oscillator beam simply by rotating the prism. This has no effect on the mixing efficiency since all reflections are at the same beam splitter interface.

In a particularly useful embodiment, the laser diode, the PIN detector, the beam splitter, the quarter wave plates, and the retroreflector are all integrally mounted in a compact housing. This integral mounting eliminates any optical degradation due to temperature changes, mechanical shock, etc. Such a compact assembly provides obvious advantages in production, maintenance, and design.

Thus, the present invention provides a high-resolution, three-dimensional, real-time scanning vision system usable in a wide variety of applications such as robot vision, materials handling, Q/C inspection, physical security systems, military and space robots, etc.

BRIEF DESCRIPTION OF THE DRAWINGS

The advantageous features of the present invention may be more readily understood from the following detailed description of the presently preferred exemplary embodiment when taken together with the attached drawings in which.

DETAILED DESCRIPTION OF THE PRESENTLY PREFERRED EXEMPLARY EMBODIMENT

Figure 1:
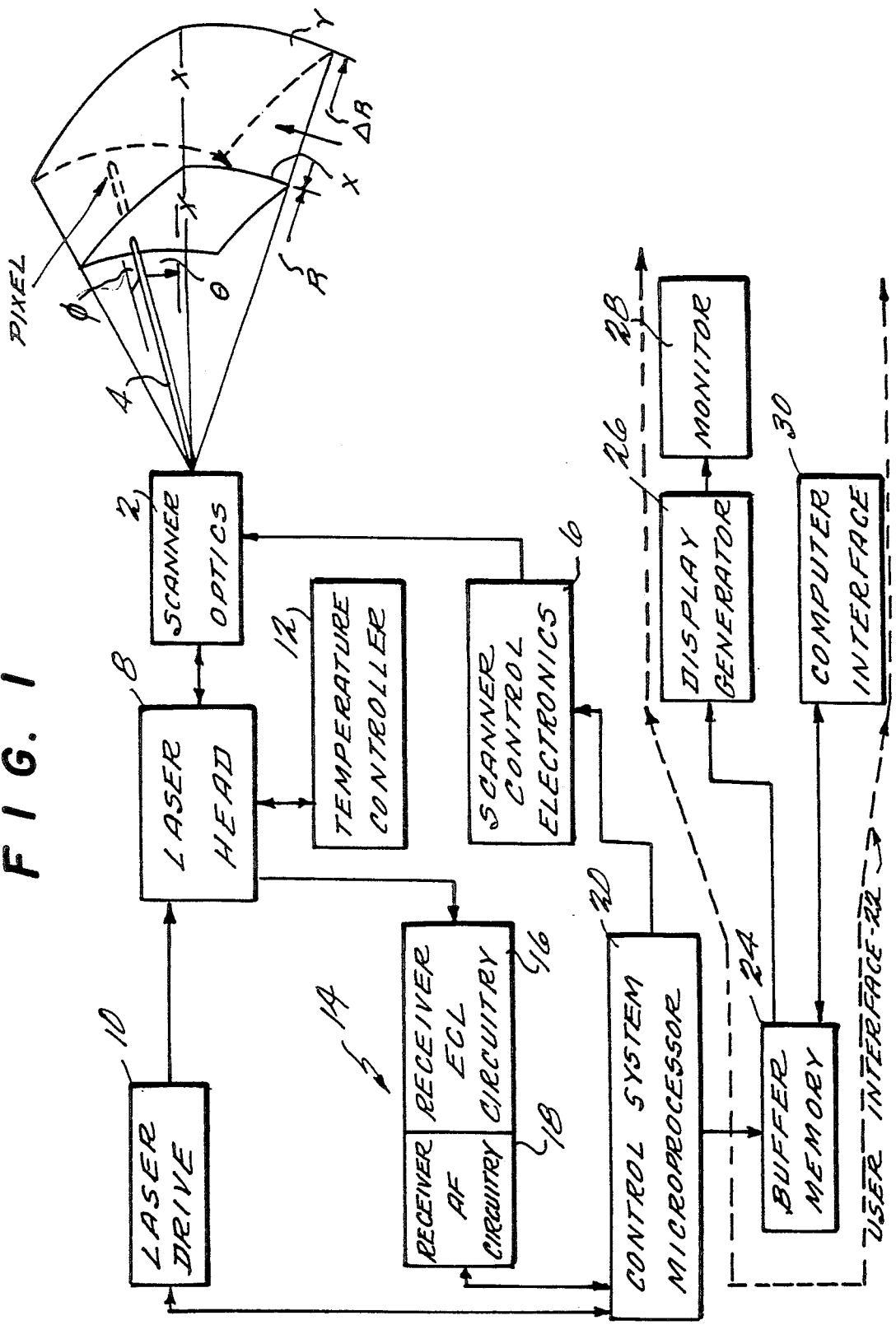
FIG. 1 depicts a block diagram showing the over-all system according to the present invention.

The present invention relates to a rapid-scanning, three-dimensional optical vision system. A field of 256×256 pixel elements, and 256 range bits can be mapped at frame rates of nearly 10 frames per second. Improvements in laser diode and photodetector technology could allow frame rates of nearly 60 frames per second to be achieved with the present invention.

Although coherent optical detection utilizing injection laser diodes are inherently capable of high precision range measurement (approaching 0.0001 inches), the dwell time per pixel for extreme precision is incompatible with high frame rates. Relaxation of range resolution results in a direct reduction of the required mapping time per frame. Such an arrangement provides an effective three-dimensional vision system whose dynamic requirements call for higher frame rates. For a serialized data stream having 256 range cells, the data rate for 60 frames per second is 32 megabits per second. Each frame storage requirement is thus 66 kilobytes. For such a system, a pixel rate of 3.9 million pixels per second may be achieved where the target area to be mapped is approximately 1 meter × 1 meter with a depth range of 1 meter. In such a system, the pixel size would be approximately 4 mm × 4 mm with a range resolution of 4 mm.

Referring to FIG. 1, the basic components of the present invention will be described. A three-dimensional target is denoted by curved surfaces X and Y. In a preferred embodiment, the dimensions of curved surface Y are approximately 1 meter × 1 meter. The range resolution of the system $\Delta R$ is also 1 meter, thus providing a 1 meter cube volume from which target information may be derived.

Scanner optics 2 scans a source light beam 4 through the target volume. The source light beam scans the target volume 1 pixel (more appropriately voxel) at a time. Scanner optics 2 is controlled by scanner control electronics 6 to scan source light beam 4 through the target volume utilizing changes in azimuth angle $\Phi$, and elevation angle $\theta$. Those of skill in this field will recognize that many scanning techniques may be utilized within the scope of the present invention. For example a serpentine scan pattern or a raster scan pattern may be used. A more detailed description of the scanning control will be provided below.

Laser head 8 provides the optical source light beam to scanner optics 2. Laser head 8 is driven by laser driver 10 which acts to modulate the source light beam. In the preferred embodiment, the laser driver 10 provides frequency modulation to the source light beam.

Temperature controller 12 acts to stabilize laser head 8 to provide a stable source light beam.

After reflection from the target, the return light beam passes back through the laser head 8 to receiver circuitry 14. Receiver circuitry 14 may include receiver ECL circuitry 16, and receiver RF circuitry 18. The structure and functions of such circuitry are known in the field and will not be described in detail. Suffice it to say that this combination of ECL and RF circuitry provides a compact yet efficient subsystem for processing the received signal.

Control system microprocessor 20 acts to control the system, and to output usable signals to user interface subsystem 22. Microprocessor 20 thus controls the scanning of the source light beam through scanner control electronics 6. The control system microprocessor 20 also controls the laser driver 10 to provide the appropriate modulation to the source light beam. The microprocessor also acts to control receiver circuitry 14, and to receive output signals therefrom. Finally, control system microprocessor 20 outputs usable signals to user interface 22, including a buffer memory 24. Those of skill in this field understand that a wide variety of user equipment may be implanted in user interface subsystem 22. For example, a display generator 26 may provide image data to a monitor 28. Likewise, computer interface 30 may be coupled to buffer memory 24 so that usable signals may be provided to a further processing system, such as the controller of a NC (Numerically Controlled) robot.

Figure 2B:
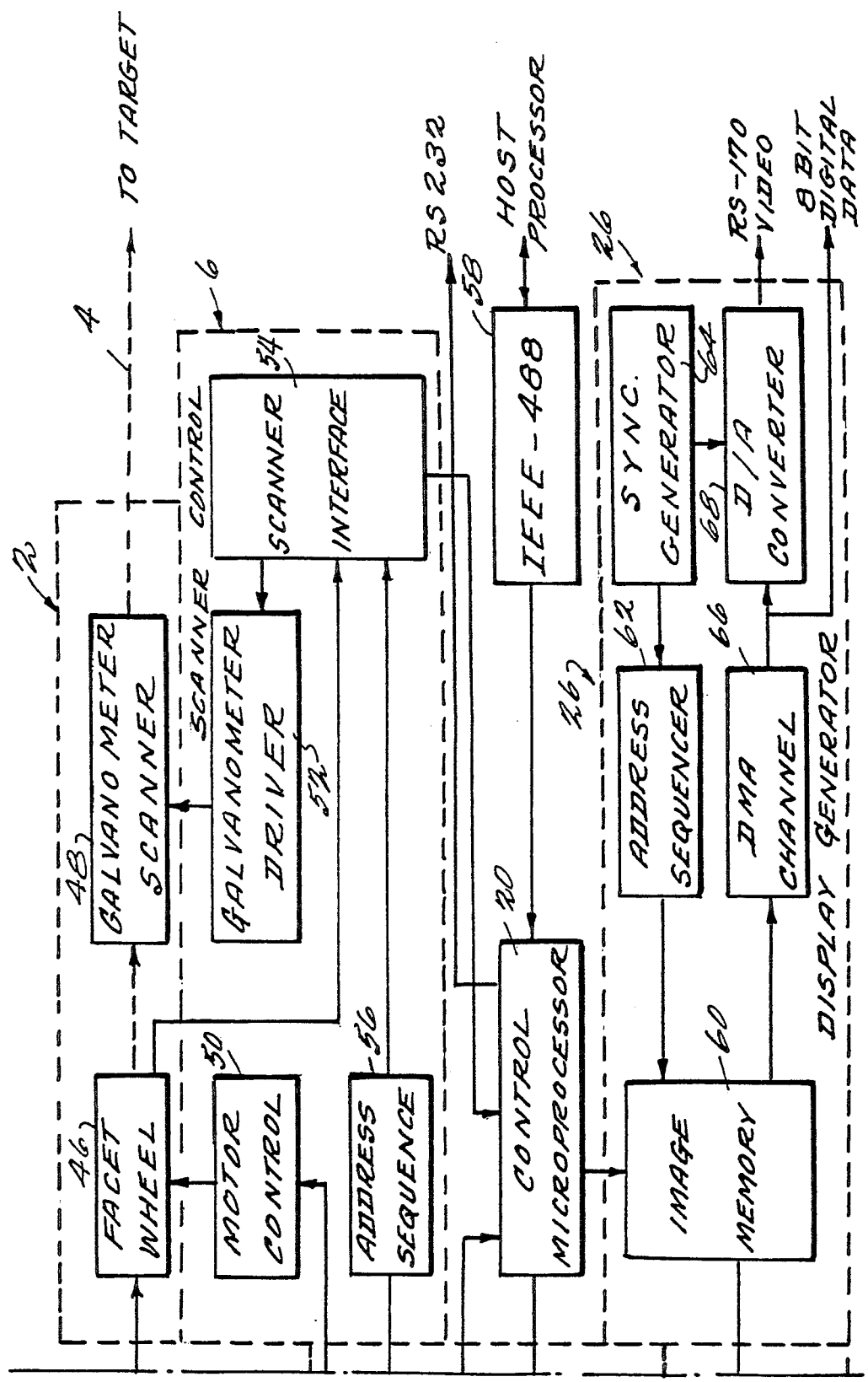
FIGS. 2 A and 2B depict a more detailed block diagram according to the preferred embodiment.

FIGS. 2A and 2B show a more detailed block diagram of the presently preferred exemplary embodiment. In FIG. 2A, optical head control 32 includes temperature controller 12 and sensor optics 34. Sensor optics 34 includes laser head 8 depicted in FIG. 1. Temperature controller 12 is used to maintain a stable operation of sensor optics 34.

FIG. 2A also depicts a transmitter section 36 which drives the sensor optics 34. Transmitter section 36 includes laser driver 10 fed by a digital-to-analog converter 38, which is in turn driven by timing generator 40. Timing generator 40 is controlled by control microprocessor 20 (depicted in FIG. 2B). D/A converter 38 is also fed by waveform memory 42, which is controlled by microprocessor 20 through data interface 44.

The pixel rate of the system is determined by the laser driver 10 which delivers a pulse to a horizontal counter (not shown) for each FM sweep of the laser source, while the horizontal counter delivers a pulse to a vertical counter (not shown) at the end of each sweep. Such counters may be used to control horizontal facet wheel 46 and vertical galvanometer scanner 48 (see FIG. 2B) and set the address in the memory address register.

Referring to FIG. 2B, the source light beam is provided to scanner optics 2. Scanner optics 2 may include a facet wheel 46 for controlling the horizontal scan, and a galvanometer scanner 48 for controlling the vertical scan. However, persons of skill in this field will understand that a wide variety of mechanical and electronic scanning devices may be used to scan the source light beam across the target. For example, holographic scanners may be used since the present invention encompasses single mode lasers. In general, the scanning methodology may be described as follows:

A pixel may be defined as an illuminated spot with a diameter d, an area $d^2$, and a thickness $\delta R$, where $\delta R$ is defined as the range resolution. A frame is defined as an arbitrary surface of overall dimensions X, Y, and a thickness of $\Delta R$ (depth of range). Thus, the number of pixels in a frame is equal to $(XY)/d^2$. The range precision may be defined as:

$$\delta R = c/(4\Delta f) = R/2n$$

where n = the number of counts per pixel. Thus, the range in time may be calculated as follows.

$$\tau_r = n/\dot{n} = R/2\delta R\dot{n}$$

where $\dot{n}$ = the counting rate. The pixel time may be calculated as follows:

$$\tau_p = \tau_r = \tau_s = (R/2\delta R\dot{n}) + \tau_s$$

where $\tau_s$ = the step time. Thus, the frame time T may be calculated as follows:

$$T = (XY/d^2) \times ((R/2\delta Rn) + \tau_s).$$

The optical heterodyne fringe counting rate n or signal frequency $f_s$ assumed for these estimates is approximately 300 MHz. The proposed technique to measure the signal frequency is through the use of a frequency discriminator whose output bandwidth is matched to the pixel bandwidth. Each pixel position and range can be encoded. For a serialized data stream having 256 range cells, the data rate for 4 frames per second is two megabits per second. Each frame storage requirement is thus 66 kilobytes.

As presently envisioned, the present invention may include a slow scan or a fast scan technique depending upon the target to be imaged. Requirements for scanning optics for the slow scan and the fast scan systems are different from each other. The slow scan needs can be met with X-Y galvanometers while those of the fast scan may require either a spinning facet wheel or resonant oscillators. Since the mirrors and galvanometers have mechanical inertia, a step time is required to move the beam from one pixel to another. Step time can be minimized by choosing a scan methodology such that the beam always steps only one beam position at a time. Such a scan system is possible by eliminating the retrace step from both the horizontal and vertical scans, thereby producing a serpentine type scan. The serpentine scan raster is therefore not directly compatible with television displays. The slow scan pixel rate is assumed to be 262,144, allowing for a 4 microsecond pixel time and a scan field of $256 \times 256 = 65,356$ pixels. The frame (field) rate is thus 4 frames per second. However, the image may be stored in a buffer memory so that every other horizontal scan line is stored in reverse sequence. One complete scanning sequence therefore consists of two frames. The first is serpentine scanned from upper right to lower left, while the second retraces this pattern in reverse. Known memory storage techniques may be used to store the image. The above-described scanning method has the effect of producing a computer image that appears as if it were scanned in a conventional television type raster, and thus commercially available video display generators may be used to produce RS-170 compatible video for presentation on a video monitor.

Circuitry required to generate the serpentine scan may be easily provided. An 8 bit counter may count pixels within each horizontal scan line. Similarly, a second 8 bit counter keeps track of even and odd frames. The outputs of the X and Y position counters are fed to a set of exclusive OR gates (not shown) that allow position indices to be complemented. The least significant bit of the Y address counter is used to control inversion of the X addresses on odd scans. In a similar manner, the frame counter is used to invert the Y addresses on odd numbered frames. The resultant X-Y scan sequence is used both to control the position of the scanner and the storage address of the corresponding pixel.

An alternative scan pattern may be a fast scan pattern which could upgrade the visions system to approximately 60 frames per second. Thus, a scanning system may be considered which is capable of fast-scan as well as slow-scan without significant modification. In the fast-scan case, the horizontal scanning pattern may be produced by a facet wheel or holographic wheel that is synchronized to pixel timing signals from the laser drive circuitry. A modulo 256 clock is fed to the scan synchronization input of a spinning facet wheel scanner. The scanner generates a uniform left-to-right scan pattern with virtually instantaneous (less than one pixel time) retrace time. The 8 bit counter that counts within an individual scan line is also used as the least significant part of a 16 bit pixel address that is transferred to the control processor. The carry output of the horizontal pixel counter is used to enable the vertical scan counter. This 8 bit counter is used as the most significant part of the pixel address for the control processor, and also drives a conventional galvanometer scanner to provide the vertical scan. However, unlike the horizontal scan which always performs left-to-right scanning, the vertical scanner alternates between top-to-bottom and bottom-to-top scan patterns, thereby never having to move in increments of more than one pixel at a time.

Returning to FIG. 2B it can be seen that scanner optics 2 is controlled by scanner control 6. Scanner control 6 includes a motor control 50 for driving facet wheel 46. Motor control 50 is controlled by control microprocessor 20 through timing generator 40. Galvanometer scanner 48 is controlled by galvanometer driver 52 which is controlled by scanner interface 54. Scanner interface 54 is, in turn, controlled by microprocessor 20 and is fed by address sequencer 56 and facet wheel 46.

Also shown in FIG. 2B is an IEEE-488 interface 58 which may be used to connect control micro-processor 20 to a host processor in a given vision system.

Also shown in FIG. 2B is display generator 26. Display generator 26 may include an image memory 60 which is also controlled by control micro-processor 20. Image memory 60 is also fed by address sequencer 62 which is controlled by sync generator 64. The output of image memory 60 is provided to DMA channel 66 which can provide an 8-bit digital data output, and/or can feed D/A converter 68 which then provides an RS-170 analog video output.

After the source light beam is reflected from the target, it returns to sensor optics 34 for detection processing. Referring again to FIG. 2A, an electrical output from sensor optics 34 is provided to RF section 70. Specifically, the electrical signal is provided to an amplifier 72, and then to an RF amplifier 74. The amplified signal is then provided to a mixer 76 which mixes it with a local oscillator signal from local oscillator 78. The mixed signal is then provided to intermediate frequency amplifier 80 for amplification. The IF signal then proceeds to limiter 82 and to discriminator 84 in a known manner. The output signal of discriminator 84 is then provided to baseband circuitry 86. Specifically, the output of discriminator 84 is fed to a video amplifier 88 which amplifies the signal and provides it to a matched filter 90. The matched filter 90 is also controlled by timing generator 40 from transmitter section 36. The output of matched filter 90 is provided to a sample-and-hold and A/D converter 92. The digitized signal is then provided to image memory 60 (See FIG. 2B) through DMA (Direct Memory Access) channel 94. In such a fashion, image memory 60 receives information regarding each pixel scanned on the target. Thus, FIGS. 2A and 2B depict an exemplary 3-dimensional scanning system according to the present invention.

Figure 3:
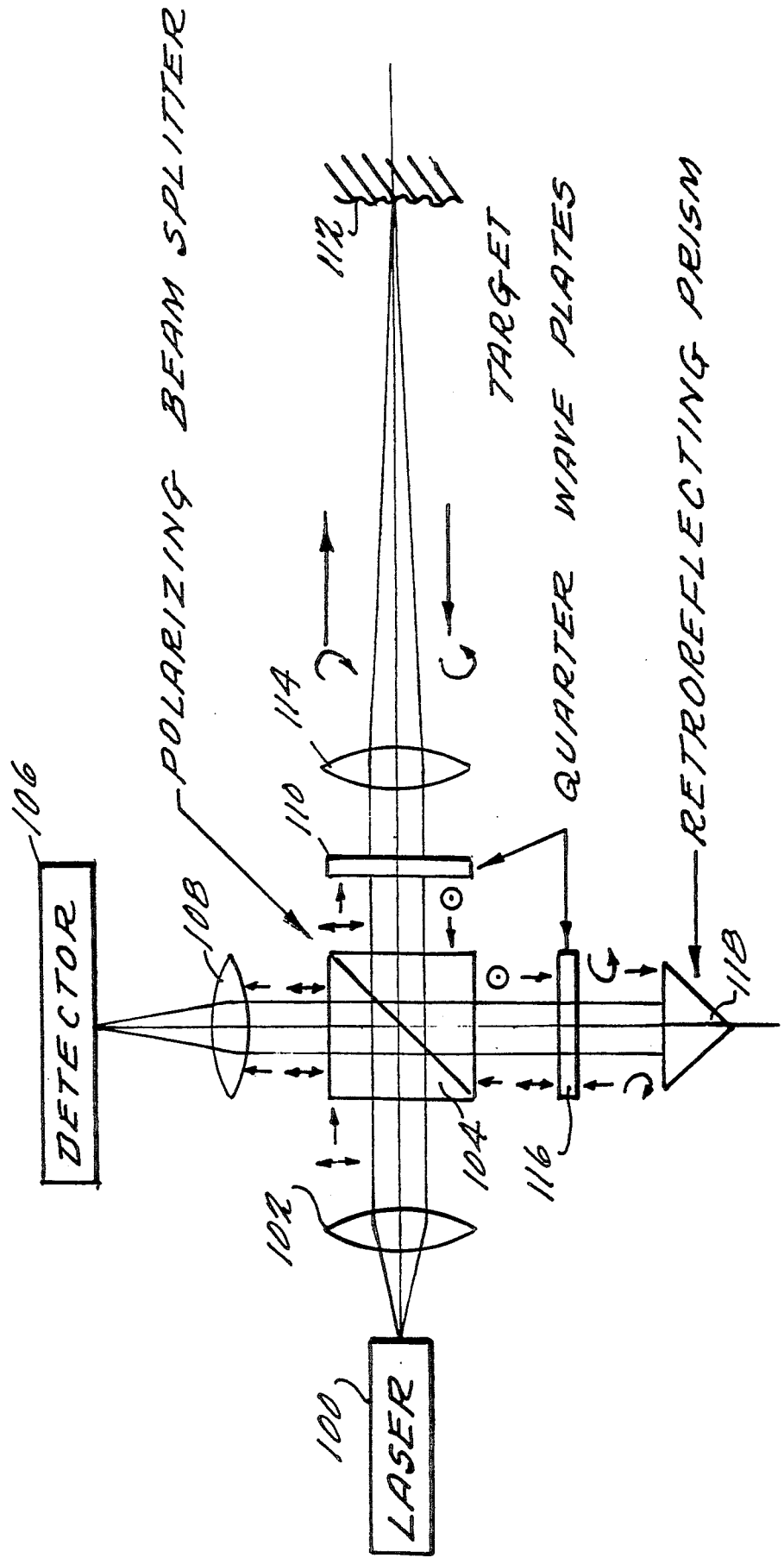
FIG. 3 is a schematic diagram showing the sensor optics according to the preferred embodiment.

Turning now to FIG. 3, the sensor optics 34 will be more fully described. Sensor optics 34 incorporates a unique method of providing a local oscillator beam such that alignment sensitivity in the sensor head is greatly reduced. In order for a coherent optical vision system to function, there must be mixing between the return light beam and the local oscillator beam. The efficiency of the mixing is determined by how closely matched that radii of curvature of the two beams are, and how well the polarizations are aligned. Prior art systems required at least two independent critical optical adjustments to change the center of focus of the signal beam. This made a zoom focus system nearly impossible. The critical nature of the adjustments made the system unstable and very difficult to keep in alignment. The present invention includes a unique local oscillator peel-off apparatus, which does not require sensitive optical adjustment and readjustment when the focus is changed. The present invention is also extremely stable with respect to optical alignment.

According to one embodiment of the present invention, injection laser diode 100 provides a single mode, linearly polarized source light beam. For example, the source light beam may be horizontally polarized as depicted in FIG. 3. First, the source light beam is collimated by collimator lens 102. The collimated, horizontally polarized source light beam is then passed through polarizing beam splitter 104. The local oscillator beam is generated in polarizing beam splitter 104 due to inherent imperfections in thin film coating dielectrics used in making polarizing prism cubes. Part of the light in the laser polarization state is reflected rather than being transmitted through the beam splitter.

Thus, the horizontally polarized local oscillator beam is deflected in the polarizing beam splitter 104 and directed toward photo detector 106 through focusing lens means 108. The signal light beam is transmitted through polarizing beam splitter 104 toward quarter wave plate 110. Quarter wave plate converts the horizontally polarized source light beam into a circularly polarized light beam, for example, right-hand circular polarization. The circularly polarized source light beam is then focused on target 112 by focusing optics 114. Note that target 112 may be a diffuse surface. Also note that focusing optics 114 may include a single lens or a lens set (e.g. a telescope). Upon reflection from the target, the circularly polarized light beam reverses its direction of circular rotation. Therefore, the light reflected by the target which is captured by focusing optics 114 is circularly polarized in the opposite direction of the source light beam, for example, left-hand circular polarization. Note that focusing optics 114 also acts to collimate the return light beam.

The collimated return light beam passes again through quarter wave plate 110 where it is converted back to a linear polarization state perpendicular to that of the source light beam, for example, vertical polarization. Most of this light is then reflected in polarizing beam splitter 104 and directed toward quarter wave plate 116.

Quarter wave plate 116 converts the linear polarization return light beam into a circularly polarized light beam, for example from a vertical polarization state to a left-hand circularly polarized light beam.

The circularly polarized light beam is then reflected by a retroreflector, for example retroreflecting prism 118. By placing retroreflecting prism 118 on the same optical axis as the local oscillator light beam, the return signal will be colinear with the local oscillator beam, thus making careful optical alignment unnecessary.

The light beam reflected from retroreflecting prism 118 is circularly polarized in the opposite rotation of the incoming light beam, for example, right-hand circular polarization. This return light beam again passes through quarter wave plate 116, where it is converted to the same linear polarization state as the local oscillator beam, for example a horizontal polarization. This beam now passes through polarizing beam splitter 104 where the mixing occurs. The prism interface is the point of mixing of the two beams, and since both beams are collimated at this point and are of the same polarization state, perfect mixing is insured. The mixing thus creates a changing optical interference pattern which is used by photo detector 106 to derive detailed information about the target. The mixed beam is imaged on photo detector 106 which converts the optical interference pattern to an electrical signal which can be converted to a range number understandable to the host processor.

An additional advantage of using the apparatus depicted in FIG. 3 is that the loss of the polarizing beam splitter 104 is highly dependent on incidence angle. Utilizing this feature makes it possible to select a splitting ratio between the source light beam and the local oscillator light beam simply by rotating the polarizing beam splitter 104. This has no effect on the mixing efficiency since all reflections are at the same interface. The quarter wave plates, the retroreflector, the focusing optics, and the photo detector are rotated approximately twice the angle of the beam splitter rotation to keep the beams in the center portion of the optics to limit aberrations.

The only critical adjustment of the optical system of FIG. 3 is that of collimating the laser. This collimation can be accomplished with relative ease to a high degree of stability. The system will then remain in proper alignment regardless of temperature. Mechanical stress also has a minimal effect on this system. Most displacement of parts are compensated for by the self-aligning properties of the retroreflector and by the single interface wave mixing at the polarizing prism.

Figure 4:
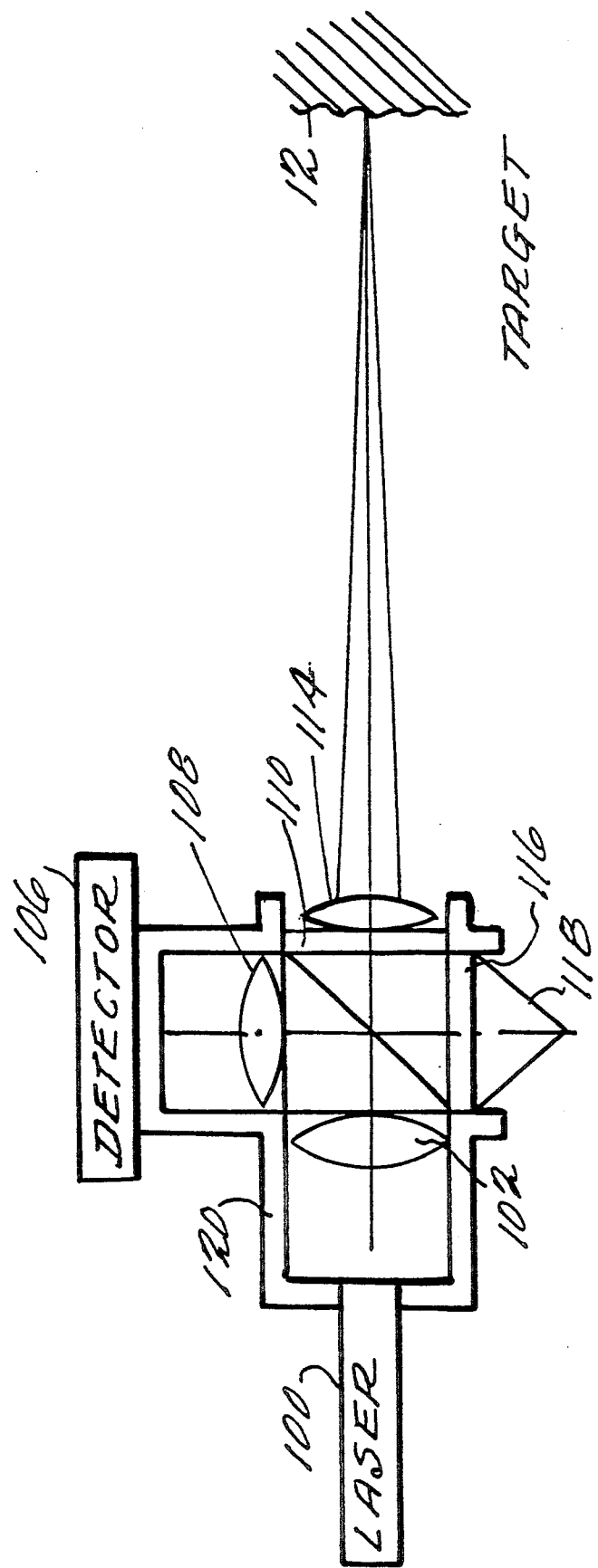
FIG. 4 is a plan view of an integrally mounted sensor optical subsystem according to a variant of the preferred embodiment.

Since the optical alignment of the system of FIG. 3 is simple and is not critical to its performance, the main components can be integrally mounted together (for example, using optical epoxy) making the system very rugged and compact. FIG. 4 depicts such a compact, rugged integral component.

FIG. 4 depicts an integral housing assembly 120 which integrally mounts: laser 100; photo detector 106; lenses 102, 108, and 114; quarter wave plates 110 and 116; and retroreflector 118. The use of optical heterodyne detection and retroreflector 118 insures that the optical aperture, (diameter of lens 114) may be made very small, thus producing a small compact device. The compact assembly of FIG. 4 is perfectly suited to mass-production techniques since optical alignment of laser 100 and lens 102 may easily be made before integral housing 120 is sealed. In such a fashion, the sensor optics section of the three-dimensional scanning vision system may be made extremely reliable and compact.

One of skill in this field will readily perceive a number of alternative embodiments. For example, photodetector 16 may comprise a photoconductor, a PN photodetector, an avalanche photodetector, photomultipliers, a resonant optical cavity detector, pyroelectrical detectors, and other known means for detecting a light beam. Currently, the PIN detector is preferred because of its heightened sensitivity. Nevertheless, different applications of the present invention may involve alternate detectors.

Likewise, those of skill in this field will readily understand that the exact embodiment of FIG. 3 may be modified without departing from the teachings of this invention and the scope of the appended claims. For example, the polarizing beam splitter 104 may have an interface configured at approximately 90 degrees from that depicted in FIG. 3, so that the local oscillator beam is directed toward retroreflector 118. Retroflector 118 reflects the local oscillator beam back through polarizing beam splitter 104 to detector 106. Meanwhile, the signal beam passes through polarizes beam splitter 104, is reflected from the target 112 and returned to polarizing beam splitter 104 where it is now reflected toward detector 106. Of course, the same advantages achieved by the configuration of FIG. 3 can also be achieved by the above-described alternate.

Figure 5:
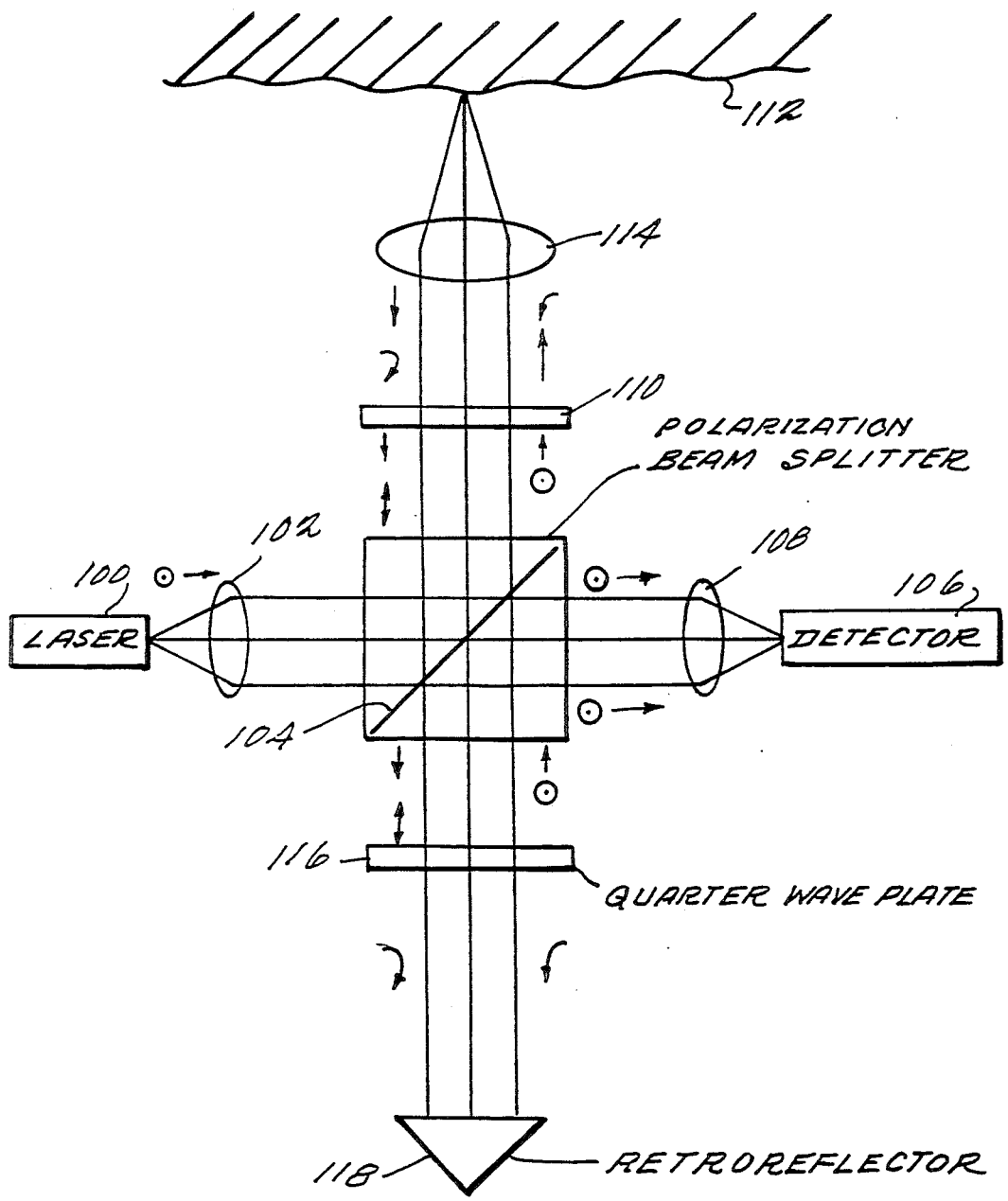
FIG. 5 is an alternative embodiment of the sensor optics.

A further alternative is depicted in FIG. 5. In FIG. 5, laser source 100 provides a polarized light beam through collimating lens 102 toward beam splitter 104. At the beam splitter, the signal light beam is reflected toward target 112, while the local oscillator beam is passed through the beam splitter 104 toward detector 106. Thus, the local oscillator propagates directly from laser source 100 to detector 106.

In beam splitter 104, the signal light beam is reflected from the beam splitter interface and directed toward target 112. The polarized signal light beam passes through quarter wave plate 110 where it is converted into circular polarization, for example, right hand circular polarization. The circularly polarized signal light beam is then focused by lens 114 on target 112.

Light reflected from target 112 is reflected as a return light beam having an opposite polarization from the incident signal light beam. For example, a left hand circularly polarized light beam is reflected from target 112, through lens 114, and towards quarter wave plate 110. At quarter wave plate 110, the left-hand circularly polarized light beam is converted into polarized light and directed toward beam splitter 104. The polarized return light beam passes through beam splitter 104, is circularly polarized by quarter wave plate 116 and directed toward retroreflector 118. Retroflector 118 reverses the circular polarization, and passes the return light beam back through quarter waver plate 16 where it is converted into polarized light. The polarized light then reflects off the interface of beam splitter 104 and is directed toward detector 106. Again, both the local oscillator light beam and the return light beam are of the same polarization state.

A further alternative based on the FIG. 5 configuration may be readily imagined. If the interface of polarization beam splitter 104 is rotated 90°, the signal light beam will be deflected first toward the retroreflector 118. After reflection, the signal light beam will pass through beam splitter 104 toward target 112. Upon reflection from the target, the return light beam will reflect off the interface of beam splitter 104 toward detector 106. Again, the functions of the quarter wave plate are the same as those described above. Thus, both the local oscillator light beam and the return light beam impinge on detector 106 in the same polarization state.

It can readily be perceived that the apparatus depicted in FIG. 5 can also be mounted in a compact, rugged housing, as shown in FIG. 4. Those of skill in this field can readily imagine that all such alternative structures share the same essential features for manipulating the polarization states of the respective light beams, together with the use of the retroreflector. All such alternative structures are to be included within the scope of protection afforded by the appended claims.

Likewise, the beam splitter means may be any device for splitting a beam, as described above. For example, a beam splitter prism, a coupler, or even cleaved fiber optic cable structures may be used in accordance with the present invention. Also, a retroreflector may include a cubed reflector, a plurality of cubed reflectors, or other equivalent structures for returning a beam along its optical axis. Again, all such equivalent structures are to be included within the scope of protection afforded by the following claims.

The overall performance of the above-described three-dimensional system is determined by the FM sweep, the width and rate of the laser source, and the speed of the electronics. It is expected that these parameters will improve with advances in optical developments. Thus, it is expected, that the vision system range, precision, and speed will improve with the development of more advanced optical components, such as electronically tunable injection laser diodes. Utilizing thermally chirped lasers, the present invention is capable of frame rates of 4 frames per second. With the use of electronically tuned laser diodes, frame rates approaching 60 frames per second may be reached. Of course, those of skill of this field understand that the teachings of this invention are applicable to improved optical components now being developed and to be developed in the future.

Thus, what has been described is a three-dimensional vision system capable of producing high-resolution images in real time. While the invention has been described in connection with what is presently considered to be the most practical and preferred embodiments, it is to be understood that the invention is not to be limited to the disclosed embodiments, but, on the contrary, is intended to cover various modifications and equivalent arrangements included within the spirit and scope of the appended claims. The scope of the appended claims is to be accorded the broadest interpretation so as to encompass all such modifications and equivalent structures.

What is claimed is:

1. A vision system for determining characteristics of a target comprising:
    optical source means for providing a source light beam which is linearly polarized in a first orientation;
    beam splitter means for splitting said source beam into a target beam and a reference beam both of which are linearly polarized in said first orientation;
    quarter wave plate means for converting said target beam to circular polarization in a first rotational direction and directing said target beam toward the target, and for receiving a return light beam reflected from said target which is circularly polarized in a second rotational direction opposite to said first rotational direction, said quarter wave plate means converting said return light beam to linear polarization in a second orientation perpendicular to said first orientation;
    retroreflector means for converting said return light beam which is linearly polarized in said second orientation to linear polarization in said first orientation and for reflecting said return beam;
    detector means for optical heterodyne detection of said reference and return beams which are both linearly polarized in said first orientation, and for providing an output signal including information about said
    scanning means for scanning said target beam across said target; and
    processing means for controlling said scanning.

2. The vision system according to claim 1 wherein said beam splitter means is a beam splitter device comprising a thin film dielectric coating for splitting said source beam by passing said target beam and by reflecting said reference beam due to inherent imperfections in said thin film coating;
    wherein said quarter wave plate means comprises first quarter wave means, optically coupled between said beam splitter device and said target, for converting the polarization of said target beam and said return beam; and
    wherein said retroreflector means comprises second quarter wave means, optically coupled between said beam splitter device and a retroreflector, for converting the polarization of said reference beam.

3. Apparatus according to claim 2 further including:
    first lens means for collimating said source beam and directing it to said beam splitter device;
    second lens means for focusing said target beam on said target; and
    third lens means for focusing said reference beam and said return beam on said detector means.

4. Apparatus according to claim 3 further including integral housing means for integrally supporting: said optical source means; said beam splitter device; said detector means; said first and second quarter wave means; and said first, second, and third lens means.

5. Apparatus according to claim 1 wherein said optical source means includes:
    laser diode means for providing said source beam; and
    laser driver means for sweep frequency modulating said source beam.

6. Apparatus according to claim 1 wherein said scanning means include:
    facet wheel means for scanning said target beam in a first direction; and
    galvanometer means for scanning said target beam in a second direction.

7. Apparatus according to claim 1 wherein said scanning means includes a holographic scanner.

8. Apparatus according to claim 1 wherein said detector means includes a PIN detector.

9. Apparatus according to claim 1 wherein said processing means receives said output signal from said detector means and includes means for storing a $256 \times 256 \times 256$ volume of information about said target.

10. An optical apparatus for splitting a source light beam which is linearly polarized in a first orientation into a target beam and a reference beam, and ensuring that a return light beam reflected from a target is linearly polarized in said first orientation, said apparatus comprising:
    beam splitter means for splitting said source beam into said target beam and said reference beam both of which are linearly polarized in said first orientation,
    quarter wave plate means for converting said target beam to circular polarization in a first rotational direction and directing it toward said target, and receiving said return light beam reflected from said target which is circularly polarized in a second rotational direction opposite to said first rotational direction, said quarter wave plate means converting said return light beam to linear polarization in a second orientation perpendicular to said first orientation,
    retroreflector means for converting said return beam which is linearly polarized in said second orientation to linear polarization in said first orientation and directing said return beam along an optical axis coincidental with an axis of said reference beam.

11. An optical apparatus according to claim 10 wherein said beam splitter means comprises:
    a beam splitter device for splitting said source beam by passing said target beam and by reflecting said reference beam due to inherent imperfections in said beam splitter device;
    wherein said quarter wave plate means comprises first quarter wave means, optically coupled between said beam splitter device and said target, for converting the polarization of said target beam and said return beam; and
    wherein said retroreflector means comprises second quarter wave means, optically coupled between said beam splitter device and a retroreflector, for converting the polarization of said reference beam.

12. Apparatus according to claim 11 further including:
    first lens means for collimating said source beam and directing it to said beam splitter device;
    second lens means for focusing said target beam on said target; and
    third lens means for focusing said reference beam and said return beam along said optical axis.

13. Apparatus according to claim 12 further including:
    optical source means for providing said source beam; and detector means for optical heterodyne detection of said reference and return beams; and for providing an output signal containing information about said target.

14. Apparatus according to claim 13 further including integral housing means for integrally supporting: said optical source means; said beam splitter device; said detector means; said first and second quarter wave means; and said first, second, and third lens means.

15. Apparatus according to claim 13 further including:
scanner means for scanning said target beam across said target; and
processor means for controlling said scanner means, for receiving said output signal from said detector means, and for storing three-dimensional information about said target.

16. An optical apparatus for splitting a source light beam which is linearly polarized in a first orientation into a reference beam and a target beam, and for ensuring that a return light beam reflected from a target is linearly polarized in said first orientation, comprising:
beam splitter means for splitting said source beam into said reference beam and said target beam, both of which are linearly polarized in said first orientation, and for directing said reference beam along an optical detection axis;
first quarter wave means for converting said target beam to circular polarization in a first rotational direction, and for converting said return light beam, which is circularly polarized in a second rotational direction opposite to said first rotational direction, to linear polarization in a second orientation perpendicular to said first orientation;
said beam splitter means reflecting said return beam after it has passed through said first quarter wave means;
second quarter wave means for converting the reflected return beam to circular polarization in said second rotational direction;
retroreflector means for receiving said reflected return beam after it has passed through said second quarter wave means and retroreflecting it along said optical detection axis; the retroreflected return beam being circularly polarized in said first rotational direction; and
said second quarter wave means converting the retroreflected return beam to linear polarization in said first orientation to cause optical heterodyne mixing of said retroreflected return and reference beams along said optical detection axis.

17. An optical apparatus for splitting a source light beam which is linearly polarized in a first orientation into a reference beam and a target beam, and for ensuring that a return light beam reflected from a target is linearly polarized in said first orientation, comprising:
beam splitter means for splitting said source beam into said reference beam and said target beam, both of which are linearly polarized in said first orientation, and for directing said reference beam in a first direction along an optical detection axis;
first quarter wave means for converting said target beam to circular polarization in a first rotational direction, and for converting said return light beam, which is circularly polarized in a second rotational direction opposite to said first rotational direction, to linear polarization in a second orientation perpendicular to said first orientation;
said beam splitter means reflecting said return beam after it has passed through said first quarter wave means in a second direction along said optical detection axis;
second quarter wave means for converting the reflected return beam to circular polarization in said second rotational direction;
retroreflector means for receiving said reflected return beam after it has passed through said second quarter wave means and retroreflecting it along said optical detection axis in said first direction, the retroreflected return beam being circularly polarized in said first rotational direction;
said second quarter wave means converting the retroreflected return beam to linear polarization in said first orientation to cause optical heterodyne mixing of said retroreflected return and reference beams along said optical detection axis in said first direction.

18. An optical apparatus for splitting a source light beam which is linearly polarized in a first orientation into a reference beam and a target beam, and for ensuring that a return light beam reflected from a target is linearly polarized in said first orientation, said apparatus comprising:
beam splitter means for splitting said source beam into said reference beam and said target beam, both of which are linearly polarized in said first orientation, and for directing said target beam toward said target along an optical target axis and for transmitting said reference beam along an optical detection axis;
first quarter wave means for converting said target beam to circular polarization in a first rotational direction, and for converting said return light, which is circularly polarized in a second rotational direction opposite to said first rotational direction, to linear polarization in a second orientation perpendicular to said first orientation;
said beam splitter means transmitting therethrough said return beam after it has passed through said first quarter wave means;
second quarter wave means for converting the transmitted return beam to circular polarization in said second rotational direction;
retroreflector means for receiving said transmitted return beam after it has passed through said second quarter wave means and retroreflecting it along said optical target axis, the retroreflected return beam being circularly polarized in said first rotational direction; and
said second quarter wave means converting the retroreflected return beam to linear polarization in said first orientation, optical heterodyne mixing of said return and reference beams taking place along said optical detection axis.

19. Apparatus according to one of claims 16, 17 or 18 further including:
detector means disposed on said optical detection axis, for coherent optical detection of said mixed reference and return beams, and for providing an output signal containing information about said target; and
laser diode means for providing said source light beam.

20. Apparatus according to claim 19 further including:

scanning means for scanning said target beam across said target; and processing means for controlling said scanning means, and for receiving said output signal from said detector means, and for providing image signals containing three-dimensional information about said target.

21. Apparatus according to claim 19 further including:

first lens means, optically coupled between said laser diode means and said beam splitter means, for collimating said source light beam;

second lens means, optically coupled between said beam splitter means and said target, for focusing said target beam on said target; and third lens means, optically coupled between said beam splitter means and said detector means, for focusing said mixed return and reference beams on said detector means.

22. Apparatus according to claim 21 further including integral support means for integrally housing: said laser diode means; said detector means; said retroflector means; said first and second quarter wave means; and said first, second, and third lens means.

* * * * *